United States Patent [19]

Nomura et al.

[11] 4,299,924
[45] Nov. 10, 1981

[54] POLYISOCYANURATE RESIN AND PROCESS FOR MAKING THE SAME

[75] Inventors: Takao Nomura, Toyota; Yoshio Taguchi, Atsuta; Kozaburo Nagata, Kusatsu; Takuji Isaka, Kyoto, all of Japan

[73] Assignees: Toyota Jidosha Kogyo Kabushiki Kaisha, Toyota; Sanyo Chemical Ind., Ltd., Kyoto, both of Japan

[21] Appl. No.: 169,809

[22] Filed: Jul. 17, 1980

[30] Foreign Application Priority Data

| Aug. 10, 1979 [JP] | Japan | 54/102647 |
| Nov. 9, 1979 [JP] | Japan | 54/145625 |
| Jun. 6, 1980 [JP] | Japan | 55/76962 |
| Jun. 6, 1980 [JP] | Japan | 55/76963 |

[51] Int. Cl.$^3$ ............................................. C08G 18/14
[52] U.S. Cl. ............................. 521/131; 521/174; 521/176; 528/75; 528/76; 528/77
[58] Field of Search ................. 521/131, 174, 176; 528/75, 76, 77

[56] References Cited

U.S. PATENT DOCUMENTS

| 3,383,351 | 5/1968 | Stamberger | 521/137 |
| 4,092,276 | 5/1978 | Narayan | 521/174 |
| 4,129,693 | 12/1978 | Cenker et al. | 521/174 |
| 4,129,697 | 12/1978 | Schapel et al. | 521/176 |

FOREIGN PATENT DOCUMENTS

| 1308571 | 2/1973 | United Kingdom . |
| 1550257 | 8/1979 | United Kingdom . |

OTHER PUBLICATIONS

Buist (ed), *Advances in Polyurethane-1*, Applied Science, London, 1978, pp. 128-130.
Frisch et al., (ed), *Advances in Urethane Science & Technology*, Technomic, Westport, Conn., 1976, pp. 132, 133, 156, 157.

*Primary Examiner*—Maurice J. Welsh
*Attorney, Agent, or Firm*—Oblon, Fisher, Spivak, McClelland & Maier

[57] ABSTRACT

High-density polyisocyanurate resins having improved rigidity, heat resistance and/or impact resistance can be obtained by reacting a polyisocyanate with a polymer polyol derived from a polyol having a molecular weight of at least 4500, and optionally a crosslinker, in the presence of trimerization catalyst, using isocyanate index of 200-5000.

27 Claims, No Drawings

POLYISOCYANURATE RESIN AND PROCESS FOR MAKING THE SAME

BACKGROUND OF THE INVENTION

1. Field of the Invention:

This invention relates to polyisocyanurate resins. More particularly, it relates to high-density polyisocyanurate resins having improved properties such as rigidity, high-temperature properties, impact resistance and curing characteristics, and a process of making the same.

2. Description of the Prior Art:

It has been known that polyisocyanurate foams have good heat resistance and flame resistance. It has also been proposed to produce such polyisocyanurate foams with heat-resistant heterocyclic structures formed by cyclization of grafted side-chain acrylonitrile groups, using polymer polyols (acrylonitrile-grafted polyetherpolyols). However these foams are high-expanded, and brittle and not high-impact, and their heat resistance and rigidity are not fully satisfied.

SUMMARY OF THE INVENTION

Accordingly, it is an object of the present invention to provide a polyisocyanurate resin having improved rigidity (or stiffness).

It is another object of this invention to provide a polyisocyanurate resin having improved heat resistance in addition to improved rigidity. It is yet another object of this invention to provide a polyisocyanurate resin with improved shock impact resistance.

Briefly, these and other objects of the invention as hereinafter will become more readily apparent have been attained broadly by providing a process for producing a high-density cellular or non-cellular polyisocyanurate resin from an organic polyisocyanate, a high-molecular polyhydroxyl compound, optionally a crosslinker, a catalyst for trimerization of isocyanate, and optionally a blowing agent, by (1) using, as at least a part of the high-molecular polyol, a polymer polyol derived from an ethylenically unsaturated monomer and a high-molecular polyol having a molecular weight of at least 4500, (2) using said polyisocyanate in an amount providing isocyanate index of 200-5000, and (3) making the density of the resin at least 0.5 g/cm$^3$.

DETAILED DESCRIPTION OF THE PREFERRED EMBODIMENTS

The high molecular polyols used for producing the polymer polyols include polyether polyols, polyester polyols and mixtures of them, having hydroxyl equivalent weights of preferably 1500-3000.

Illustrative of such polyether polyols are alkylene oxide adducts of polyfunctional compounds having at least two active hydrogen atoms, such as polyhydric alcohols, polyhydric phenols, polycarboxylic acids and amines. Suitable polyhydric alcohols include, for example, diols, such as ethylene glycol, propylene glycol, 1,4-butane diol, 1,6-hexane diol, neopentyl glycol, diethylene glycol, bis(hydroxymethyl)cyclohexane and bis(hydroxyethyl)benzene; triols, such as glycerol, trimethylol propane, trimethylol ethane and 1,2,6-hexane triol; polyols having 4 or more hydroxyl groups, such as pentaerythritol, methylglucoside, diglycerol, sorbitol, sucrose, and the like. Examples of suitable polyhydric phenols are mononuclear polyhydric phenols, such as hydroquinone, catechol, resorcin and pyrogallol and; polynuclear polyhydric phenols, such as bisphenols (bisphenol A, bisphenol F and the like). Illustrative of suitable polycarboxylic acids are aliphatic polycarboxylic acids, such as succinic acid, glutaric acid, adipic acid, sebacic acid, maleic acid, fumaric acid, itaconic acid and dimer acids; and aromatic polycarboxylic acids, such as phthalic acid, terephthalic acid and trimellitic acid. Suitable amines are inclusive of aliphatic polyamines, such as ethylenediamine, trimethylenediamine, hexamethylenediamine and diethylenetriamine; heterocyclic polyamines, such as piperazine and N-aminoethylpiperazine; aromatic polyamines, such as tolylenediamine, phenylenediamine, xylylenediamine, diphenylmethanediamine and polyphenylmethanepolyamine; alicyclic polyamines, such as cyclohexylenediamine, dicyclohexylmethanediamine and isophoronediamine; ammonia; alkanol amines, such as mono-, di- and tri-ethanolamines, propanolamines and butanolamines; and monoamines (aliphatic, aralkyl, aromatic), such as methylamine, ethylamine, isopropylamine, butylamine, benzylamine, aniline, toluidine and naphtylamine. Two or more of the above polyfunctional active hydrogen-containing compounds may be used. Suitable examples of the alkylene oxide reacted with the active hydrogen-containing compounds are ethylene oxide, propylene oxide, 1,2-, 2,3-, 1,3-butylene oxides, tetrahydrofurane, styrene oxide and epichlorhydrin, and two or more of the alkylene oxides. In case of adding two or more kinds of alkylene oxides, block-addition, random-addition or combination of them may be employed. Among these alkylene oxides, preferred are propylene oxide and/or ethylene oxide. Combinations of propylene oxide and/or ethylene oxide with a minor proportion of other alkylene oxides (such as butylene oxides, tetrahydrofurane, styrene oxide) are also preferred. In view of reactivity, particularly preferred is combination of propylene oxide and ethylene oxide (weight ratio: usually 30:70-95:5 particularly 70:30-90:10). Addition of the alkylene oxides to the active hydrogen-containing compounds can be carried out in the usual way, with or without catalysts (such as alkaline catalysts, amine catalysts and acidic catalysts), under normal or elevated pressure.

The polyester polyols employed instead of or in conjunction with the polyether polyols to produce the polymer polyols, are inclusive of condensed polyester polyols obtained by reacting low molecular polyols with a dicarboxylic acids, and polyester polyols obtained by ring-opening polymerization of lactones. Suitable low molecular polyols are, for example, diols such as ethylene glycol, propylene glycol, 1,4-butane diol, 1,6-hexane diol, neopentyl glycol, diethylene glycol, bis(hydroxymethyl)cyclohexane and bis(hydroxyethyl)benzene; triols such as trimethylol propane and glycerol; and mixtures of two or more of these polyols. Suitable dicarboxylic acids include aliphatic dicarboxylic acids such as succinic acid, glutaric acid, adipic acid, sebacic acid, maleic acid, fumaric acid and dimer acids; and aromatic dicarboxylic acids such as phthalic acid and telephthalic acid; and mixtures of two or more of these acids. The lactones include, for example, ε-caprolactone.

The high-molecular polyols, employed as starting materials in making the polymer polyols, have an average molecular weight, determined by hydroxyl value, of usually at least 4500, preferably 5000-12000, more preferably 5000-10000. When polyols having molecular weights less than 4500 are used as the starting materials, impact properties of final products are unsatisfied. Preferable hydroxyl value of the high-molecular polyols is 35–15 (particularly 30–20), and preferable functionality is 2–5 (particularly 3–4).

Among these high-molecular polyols, preferred are polyether polyols. Preferable polyether polyols are ones having primary hydroxyl terminal group. Content of the primary hydroxyl group is usually 10–80%, preferably 30–50%. Illustrative of such primary hydroxyl group-containing polyether polyols are polyether polyols containing terminal oxyethylene groups, including tipped-type polyols and balanced-type polyols. Terminal oxyethylene content is usually 5–50% (by weight) preferably 5–30%. Polymer polyols, prepared from such primary hydroxyl group-containing polyether polyols, provide final products having improved molding properties and curing properties in addition to high rigidity, impact resistance and heat stability.

Examples of suitable ethylenically unsaturated monomers used for producing the polymer polyols are:

(a) acrylic monomers:
(meth)acrylic acid (acrylic acid and methacrylic acid; similar expressions are used hereinafter), and derivatives there of, for example, (meth) acrylonitrile, esters (such as methylester and dimethylaminoethylester), salts (such as ammonium salt and alkali metal salts), (meth)acrylamide, and the like;

(b) aromatic vinyl monomers:
styrene, α-methyl styrene, and the like;

(c) aliphatic hydrocarbon monomers:
ethylene, propylene, butadiene, isobutylene, isoprene, 1,4-pentadiene, and the like;

(d) vinyl esters:
vinyl acetate, vinyl propionate, vinyl butyrate, vinyl-2-ethyl-hexoate, and the like;

(e) vinyl halides:
vinyl chloride, vinylidene chloride and the like; and (f) vinyl ethers:
vinyl methyl ether, and the like.

Among these, preferred are acrylonitrile, methylmethacrylate, styrene and butadiene. Particularly preferred are acrylonitrile and combination of acrylonitrile with styrene (weight ratio of acrylonitrile/styrene: 100/0-40/60).

Ratio of the high-molecular polyol to the monomer in the polymer polyols can be varied widely, and generally 2–70 parts, preferably 5–40 parts by weight of the monomer (or polymer) is used for each 100 parts by weight of the high-molecular polyol.

Preparation of the polymer polyol from the polyol and the ethylenically unsaturated monomer can be carried out in the usual way, for example, by polymerizing the monomer in the polyol in the presence of a polymerization catalyst (such as radical generators), as described in U.S. Pat. No. 3383351, Japan Patent Lay-open No. 15894/1975, or by grafting a polymer prepared from the monomer beforehand, and the polyol in the presence of a radical generator, as described in Japan Pat. Publication No. 47597/1972. Preferred is the former method. Suitable catalysts (radical generators) used in polymerization include, for example, azo compounds, peroxides, persulfates, perborates, etc. Among them, azo compounds, are preferred for practical use. Suitable azo compounds are, for example, azobisisobutyronitrile, 2,2'-azobis-dimethylvaleronitrile, 1,1'-azobis-cyclohexane-1-carlonitrile. The amount of the radical generating agent is not particularly limited, and for example it ranges from 0.01 to 20, preferably from 0.1 to 15 parts by weight, for each 100 parts by weight of monomer (or polymer). These radical generating agents may be charged the whole quantity at a time or by portions. The polymerization may be carried out in the presence of a solvent (such as toluene, xylene, and the like). The reaction temperature is usually 50°–170° C. preferably 90°–150° C.

The polymer polyols thus obtained have hydroxyl value of generally 10 to 100, preferably 20 to 50, more preferably 20–30.

The polymer polyols thus obtained can be used alone or as a mixture of two or more kinds of polymer polyols (such as a mixture of polyetherpolymer polyol and polyester-polymer polyol), or together with ordinary high-molecular polyols other than polymer polyols, for example polyether polyols and polyester polyols, as described in as the starting materials in preparing the polymer polyols. The ordinary polyols have a molecular weight of generally 1000–10000 preferably 5000–10000 and hydroxyl value of usually 250–15 preferably 30–20. The amount of the ordinary high-molecular polyol is preferably 0–35%, more preferably 0–20% based on the total weight of the high-molecular polyhydroxyl compounds. Use of larger amount of the ordinary polyols than above range results in poor rigidity and poor heat resistance.

In producing the polyisocyanurate resins according to this invention, any of the crosslinkers commonly employed for making polyurethane or polyisocyanurate resins can be used, in conjunction with the high-molecular polyhydroxyl compounds comprising the above polymer polyols. The crosslinking agents are inclusive of low-molecular polyfunctional compounds having active hydrogen atoms, such as crosslinking polyols, polyamines, aminoalcohols and mixtures of two or more of them. The crosslinkers have an equivalent weight of generally 30–140 preferably 30–100, and have a functionality of usually 2–8 preferably 2–4. Functionality of crosslinking polyols is preferably 3–4.

Illustrative of the crosslinking polyol are polyhydric alcohols, which are given above with regard to the preparation of the polyether polyols as the starting materials for the polymer polyols; adducts of low moles of alkylene oxides with polyfunctional compounds having at least two active hydrogen atoms, such as polyhydric alcohols, polyhydric phenols, polycarboxylic acids and amines, which are also described above. The crosslinking polyols have preferably a primary hydroxyl group content of 30–100%. Preferred crosslinking polyols are ethylene glycol, 1,4-butane diol, trimethylol propane, glycerol, 1,2,6-hexane triol, and alkylene oxide adducts of these compounds.

Suitable polyamines as the crosslinkers include aliphatic polyamines, heterocyclic polyamines, aromatic polyamines, alicyclic polyamines, which are also given above regarding the polyether polyols.

Suitable examples of the aminoalcohols are ethanol amine and propanol amine.

Among these crosslinkers, low-molecular polyols are preferred.

The organic polyisocyanate used in the preparation of the polyisocyanurate resins of this invention can be any of the polyisocyanates conventionally employed in producing polyurethane or polyisocyanurate resins. Suitable organic diisocyanates include aromatic diisocyanates such as phenylene diisocyanate, tolylene diisocyanate (hereinafter referred to as TDI), diphenylmethane-4,4'-diisocyanate (hereinafter referred to as MDI), 1,5-naphthalene diisocyanate, biphenylene-4,4'-diisocyanate; aralkyl diisocyanate such as xylylene diisocyanate; aliphatic diisocyanates such as ethylene diisocyanate, trimethylene diisocyanate, tetramethylene diisocyanate, hexamethylene diisocyanate, lysine diisocyanate; alicyclic diisocyanates such as isophorone diisocyanate, isopropylidenecyclohexyl diisocyanate, hydrogenated TDI, hydrogenated MDI; and mixtures of them. Among the above mentioned organic diisocyanates, preferred are aromatic diisocyanates, and more preferred is TDI and MDI, from the standpoint of practical use. These polyisocyanates may be crude polyisocyanates such as crude TDI, and crude MDI [polyarylpolyisocyanates (PAPI): phosgenated products of crude diaminodiphenylmethane, containing a minor amount (for instance, 5-20% by weight) of polyamines having 3 or more functionality, obtained by condensation of formaldehyde with an aromatic amine or a mixture thereof]. There may be used modified or liquefied polyisocyanates, for example, liquefied MDI(such as carbodiimide-modified or trihydrocarbylphosphate-modified, as described in British Pat. No. 918454 and Belgian Pat. No. 678773), or isocyanate-terminated prepolymers obtained by reacting polyols with excess polyisocyanates. Suitable polyols employed for producing such prepolymers include, for instance, glycols such as ethylene glycol, propylene glycol, diethylene glycol, and the like; triols such as trimethylol propane, glycerol, and the like; high-functional polyols such as pentaerythritol, sorbitol, and the like; adducts of these polyols and alkylene oxides (ethylene oxide and/or propylene oxide). Hydroxyl equivalent weight of the polyols is preferably 30-200. Preferred are polyols having functionality of 2-3. Free isocyanate content of these modified polyisocyanates and these prepolymers is generally 10-35%, preferably 15-30% most preferably about 25%. There can be used two or more of polyisocyanates described above, for example, mixtures of modified polyisocyanates and prepolymers.

The blowing agents used optionally in producing the polyisocyanurate resin of this invention include water and/or halogenated aliphatic hydrocarbons such as those conventionally employed in preparing rigid polyurethane foams. The halogenated aliphatic hydrocarbon blowing agents have generally boiling points ranging from $-40°$ C. to $110°$ C. Examples of halogenated aliphatic hydrocarbons are trichloromonofluoromethane, dichlorodifluoromethane, chlorotrifluoromethane, 1,1-dichloro-1-fluoroethane, 1,1-difluoro-1,2,2-trichloroethane and 1,1,1-tribromo-2-chloro-2-fluorobutane. Mixtures of one or more such blowing agents can be used, if desired.

The blowing agents are used in an amount so as to provide polyisocyanurate resins having an overall density of at least 0.5 g/cm$^3$ preferably at least 0.8 g/cm$^3$. The amount [% by weight based on the total weight of resins materials (polyisocyanates, polyhydroxyl compounds and crosslinkers)] of the blowing agents is as follows. When water is used alone as the blowing agent, the amount is usually 0-1% preferably 0-0.5%. In case of halogenated hydrocarbon alone the amount is generally 0-5% preferably 1-2%. In case these blowing agents are used in conbination, the amount is usually $(0 \times A + 0 \times B)$-$(1 \times A + 2 \times B)$, preferably $(0 \times A + 1 \times B)$-$(0.5 \times A + 2 \times B)$, wherein A and B are the amounts (parts by weight) of water and the halogenated hydrocarbon, respectively, contained in 1 parts by weight of the total blowing agent. In other words, the amount of the hydrogenated hydrocarbon is at most $5 \times x\%$ preferably $1 \times x\%$-$2 \times x\%$, and the amount of water is at most $1 \times y\%$ preferably at most $0.5 \times y\%$, wherein x and y are optional numbers of 0-1 which satisfy the equation: $x + y = 1$. Use of larger amounts of the blowing agent than the above range results in unsatisfied rigidity (lowering of flexural modulus less than 8000 Kg/cm$^3$) and poor resistances to impact and heat, and it necessitates to use larger molding equipments for producing high-density molded products, especially big articles molded by RIM (reaction injection molding) and causes increase of production cost.

In producing the polyisocyanurate resins according to this invention, isocyanate index is generally 200-5000 preferably 300-5000 more preferably 500-5000. Lower isocyanate index results in insufficient heat stability. Higher isocyanate index provides increased rigidity and heat-stability, but causes reduction of impact resistance.

In preparing the polyisocyanurate resins according to the present invention, the amount of the polymer polyol is usually at least 70%, preferably 85-95% based on the total weight of the high-molecular polyhydroxyl compounds (the polymer polyols and optionally the other high-molecular polyols) and the crosslinkers. When the amount is lower than the above range, polyisocyanurate resins having insufficient heat resistance and rigidity are produced.

In this invention, the proportion of the high-molecular polyhydroxyl compounds comprising the polymer polyols, the crosslinkers and the organic polyisocyanates can vary widely, according to the object and properties required. Generally, preferable range of equivalent ratio of (the cross-linker + the polyisocyanate): the high-morecular polyhydroxyl compound is at least 15:1, particularly at least 20:1, in view of heat performance and ridigity of the resulting resins. In case particularly high-impact resins are required, the equivalent ratio is preferably 25 or less:1 more preferably 20 or less:1.

When the polyisocyanurate resins are prepared without using any crosslinkers, preferred range of the equivalent ratio of the polyisocyanate: the high-molecular polyhydroxyl compound is 15-50:1 (particularly 20-30:1). Namely, preferred isocyanate index is 1500-5000 (particularly 2000-3000). Higher isocyanate index incleases heat stability and rigidity, but decrease impact resistance. The above range is preferred, in view of the balance of properties (heat stability, rigidity and impact resistance) and the mixing ratio of the active hydrogen-containing component in preparing the polyisocyanurate resins.

Polyisocyanurate resins having especially high rigidity and excellent heat performance are obtained by reacting the polyisocyanates with the high-molecular polyhydroxyl compounds and the crosslinkers in such amounts that the isocyanate index is within the range of 500-5000 (particularly 550-3500) and the equivalent ratio of (the polyisocyanate + the crosslinker): the high-molecular polyhydroxyl compound is within the range of at least 20:1 (preferably 30-150:1 more preferably 40-80:1). Use of smaller amounts of the polyisocyanate and the crosslinker than the above range results in insufficient heat resistance, and using larger amounts than above causes reduction of impact properties. Preferable equivalent ratio of the crosslinker: the high-molecular polyhydroxyl compound is 0.4-30:1, particularly 1-15:1.

In case more impact-resistant resins are required, the equivalent ratio of (the polyisocyanate+the crosslinker): the high-molecular polyhydroxyl compound is reduced to 20 or less:1, preferably 5–20:1, more preferably 15–20:1. Remarkably high-impact resins are obtained by chosing the equivalent ratio of 20 or less:1, but using too smaller ratio than the above range results in insufficient heat stability. Preferred equivalent ratio of the crosslinker: the high-molecular polyhydroxyl compound is 0.1–4:1, particularly 0.4–2.5:1. Preferred isocyanate index is 500–2000, in view of heat performance.

When the high-molecular polyhydroxyl compounds, the crosslinkers and the polyisocyanates are reacted at the isocyanate index of 200–500 and with the equivalent ratio of (the polyisocyanate+the crosslinker): the high-molecular polyhydroxyl compound of at least 20:1, there can be obtained resins having high rigidity. In this case, among the range of the above equivalent ratio, the ratio of 30–150:1 (particularly 40–80:1) is preferred for higher rigidity and heat performance, and that of less than 30:1 particularly 20–28:1 is preferable for impact strength. Preferred equivalent ratio of the polyisocyanate: the crosslinker is at least 84: at most 16, particularly 84.5:15.5 to 87.13, in view point of heat stability. Preferable equivalent ratio of the crosslinker: the high-molecular polyhydroxyl compound is 2.5:1 to 30:1.

Catalysts which are conventional for the trimerization of isocyanate groups may be used in the present invention. Some examples are described in the literature, such as Saunders, J. R. and Frisch K. C. "Polyurethanes, Chemistry and Technology", Part I, pages 94–97, & 212, Beitchmann, B. D. Rubber Age, Feb. 1966, Beitchmann, B. D. I. & E. C. Product Research and Development, Vol. 5, No. 1, pages 35–41, Mar. 1966, and Nicolas, L. and Gmitter, G. T. J. Cellular Plastics, Vol. 1, No. 1, pages 85–95 (1965); and also in British Pat. Nos. 1155768, 1184893 and 908337, U.S. Pat. Nos. 2954365 and 2993870, Japan Patent Lay-open No. 47898/1978 and Japan Patent Publication No. 25107/1971. Suitable catalysts include, for example, (a) organic strong bases or salts thereof, (b) tertiary amine cocatalyst combinations, (c) Friedel Crafts catalysts, (d) basic salts of organic weak acids, (e) alkali metal oxides, alkali metal alcoholates, alkali metal phenolates, alkali metal hydroxides and alkali metal carbonates, (f) onium compounds from nitrogen, phosphorus, arsenic, antimony, sulfur and selenium, (g) epoxides and (h) mono-substituted monocarbamic esters. Illustrative examples of these catalysts are: (a) trialkyl phosphines, trialkylaminoalkyl phenols, N,N',N''-tris(alkylaminoalkyl)hexahydrosym-triazines, and 3-and/or 4-substituted pyridine; (b) triethylene diamine-propylene oxide, triethylene diamine-trioxymethylene, N,N,N',N'-tetramethyl 1,3-butane diamine-propylene oxide, pyridine-propylene oxide, N-methylmorpholine-propylene oxide, triethylene diamine-acetaldehyde or triethylenediamine-alkyleneimine; (c) $AlCl_3$, $FeCl_3$, $BF_3$ and $ZnCl_2$; (d) alkali metal salts (such as potassium salt and sodium salt) of $C_6$–$C_{20}$ carboxylic acids, such as potassium octoate or 2-ethyl hexoate, potassium benzoate and potassium oleate; (e) potassium oxide, sodium oxide, and lithium oxide; sodium methoxide, potassium ethoxide, and potassium alcoholates formed from ethylene glycol or a polyether polyol; sodium phenolate; sodium 2,4-dinitrophenolate, potassium 2,4,6-trinitrophenolate, sodium 2,4,6-trichlorophenolate and potassium 2,4-dichlorophenolate; hydroxides and carbonates of lithium, sodium, potassium, rubidium and cesium; (f) tetraethylammonium hydroxide, benzyltriethylammonium hydroxide, tetraethylphosphonium hydroxide; (g) epoxides described in J. Cellular Plastics, Vol. I., No. 1, page 85, 1965; (h) mono-substituted monocarbamic ester described in British patent 920,080. Among these, preferred are organic strong bases and salts thereof, [particularly 2,4,6-tris(dimethylaminomethyl)phenol and N,N',N''-tris(dimethylaminopropyl)hexahydro-sym-triazine], and combinations thereof with alkali metal salts (particularly potassium salts) of carboxylic acids (particularly octoic acid). The amount of the catalyst is generally 0.1–20%, preferably 0.5–5% based on the weight of the polyisocyanate.

If desired, catalysts other than the trimerization catalyst (such as tertiary amines, organo tin catalysts, organo lead catalysts, and the like), surfactants or foam stabilizer (such as silicone surfactants), other assistants or additives (such as pigments, fillers) can be added.

In the production of the polyisocyanurate resins according to the present invention, there can be employed any of conventional techniques, including one-shot process, prepolymer process and quasi-prepolymer process. Methods, described in, for example, Japan Patent Publication Nos. 13037/1966 and 42386/1971, can be applicable.

The production of the polyisocyanurate resins of this invention is particularly useful for producing molded articles by reaction injection molding (RIM), but there may be applied molding techniques other than RIM (such as molding by open molds, PVC-integral molding), slab method, applying-in-place (such as foaming-in-place), spraying, casting, coating impregnation or other techniques.

Molded articles of the polyisocyanurate resins according to this invention by RIM can be produced using conventional techniques. For example, component A composed of a polyisocyanate and component B composed of a homogeneous mixture comprising a polyhydroxyl compound and a catalyst, optionally containing a blowing agent (water and/or a halogenated hydrocarbon), a foam stabilizer and a pigment or other additive, are prepared beforehand, and these components are charged into stock tanks of a high-pressure foaming machine; then the comporments A and B are mixed with a mixing head of the foaming machine, and injected into a closed mold through a injection nozzle of the machine, connected to a gate of the mold; and, after curing, the molded product is demolded.

High-density polyisocyanurate resins obtained according to the present invention have improved stiffness and rigidity (flexural modulus of at least 8000 $Kg/cm^2$), and improved impact resistance and heat resistance, and show rapid demolding, lower friability and improved molding properties.

Polyisocyanurate resins, prepared by employing the isocyanate index of 1500–5000 without using any crosslinker, have flexural modulus of at least 8000 $Kg/cm^2$ (particularly at least about 10000 $Kg/cm^2$, up to about 15000 $Kg/cm^2$), heat distortion temperature of at least 100° C. (particularly at least 110° C., up to 140° C.), impact strength (unnoched Izod impact strength) of at least about 8 $Kg.cm/cm^2$ (particularly about 8–15 $Kg.cm/cm^2$) and flexural strength of at least about 400 $Kg/cm^2$ (particularly about 400–420 $Kg/cm^2$).

Polyisocyanurate resins of this invention, produced by using the isocyanate index of 500–5000 and the equivalent ratio of (the polyisocyanate+the crosslinker): the high-molecular polyhydroxyl compound of at least 20:1, show excellent resistance to high temperature in addition to improved rigidity. They have heat distortion temperature of at least about 120° C. (particularly at least about 130° C., as high as 180° C. or more), flexural modulus of at least about 10000 Kg/cm$^2$ (particularly at least about 11000 Kg/cm$^2$, up to about 20000 Kg/cm$^2$), flexural strength of about 350–600 Kg/cm$^2$ and impact strength of about 3–about 10 Kg.cm/cm$^2$.

Resins of this invention, obtained with the equivalent ratio of (the polyisocyanate+the crosslinker): high-molecular polyhydroxyl compound of 20 or less:1, are highly resistant to shock impact. Their impact strength is at least about 10 Kg.cm/cm$^2$ (particularly at least 12 Kg.cm/cm$^2$, up to 20 Kg.cm/cm$^2$). They have flexural modulus of at least about 8000 Kg/cm$^2$ (particularly about 9000–12000 Kg/cm$^2$), flexural strength of 300–430 Kg/cm$^2$ and heat distortion temperature of 60°–120° C.

Resins, prepared using the equivalent ratio of (the polyisocyanate+the crosslinker): the high-molecular polyhydroxyl compound of at least 20:1 and the isocyanate index of 200–500, show improved rigidity, and have flexural modulus of at least about 10000 Kg/cm$^2$ (particularly 11000–15000 Kg/cm$^2$), flexural strength of 340–520 Kg/cm$^2$, impact strength of about 6– about 10 Kg.cm/cm$^2$ (about 9–10 Kg.cm/cm$^2$, in case the equivalent ratio is 20–28:1) and heat distortion temperature of at least about 90° C. (at least about 110° C., up to about 140° C., when the equivalent ratio of the polyisocyanate: the crosslinker is at least 84: at most 16).

Polyisocyanurate resins according to this invention, having improved properties such as rigidity, heat resistance and impact resistance, are useful in various fields of application, for instance, products in road and rail vehicles and in aircraft and watercraft, such as air filter housings, ignition distributors, heatings and housings, seat frames and panels, internal fittings, armature housings and panels, dashboard foundations, steering wheel covers, brackets, doors, hoods, luggage racks, buffers, gloove compartments, and flaps, hat racks, door handles and locking knobs, windowcranks, rear doors with windows, mudguards, headlight units, flashlight and rear light units including glass, town car bodies, spare wheels and hub caps; furnitures, such as doors, furniture bodies; flaps drawers and drawer shutters, fittings, hinges, handles and knobs; building industries products, such as windowframes and sashes, windowpanes, complete skylights, door and window handles, glass tiles, water pipes and waste pipes, fittings, handles and handwheels for heating radiators, letterboxes, ventilators, telephone booths, cable sleeves, gullies, hydrant lids or sheeting boards; electrical apparatus or appliances, such as switch covers and housings, pallettes for printed circuits, current distributor boxes and cupboards, insulators, instrument switches and plugs, lamps and light fittings, and battery boxes; acoustic or phonographic products, such as loudspeaker boxes, record player housings, radio and television housings, housing and frames for automatic musical instruments, control knobs; technical apparatus, such as housings for drilling machines, tool boxes, pump housings, pump wheels, safety helmets, office machine housings and chassis, cable drums, filter holders, track wheels and rollers, housings and chassis for cameras and projectors, tool handles; articles for domestic use, such as coat hangers, fork handles, suitcases and suitcase handles, housings for kitchen machinery, scales, sewing machines, handles for irons, frying pan handles, pot lids, pot lid handles, buckets and refuse bins, boxes and tins; bathroom fittings, such as lavatory seats, bathroom cabinets; soap dishes, shelves, towel rails, walls for shower cabinets, brush handles and brush backs; manufacturing procucts for sports and games such as slot machine games, bowling pins and balls, go-carts, wheelbarrows, toy trains, rolls for roller skates, fittingl and accessories for sailing boats, such as cleats, blocks, winch handles, position lights, bullseyes, accessories for rowing boats and paddle boats, minigolf clubs, balls and obstacles goal posts for competition ski runs and canoeing; and sealants, coatings, adhesives and the like.

Having generally described the invention, a more complete understanding can be obtained by reference to certain specific examples, which are included for purposes of illustration only and are not intended to be limiting unless otherwise specified. In the examples, % and parts designate % by weight and parts by weight, respectively.

Reactants used in the following Examples and Comparative Examples are as follows:

Polyol 1: a polymer polyol (OH value: 28) obtained by polymerizing at 100°–120° C. in the presence of 1.0 part of azobisisobutyronitrile (hereinafter referred to as ABIN), 25 parts of acrylonitrile in 100 parts of a polyether polyol (hydroxyl equivalent weight: 1666, terminal oxyethylene content: 10%) prepared by adding 4408 parts of propylene oxide (bereinafter referred to as PO) to 92 parts of glycerol followed by tipping with 500 parts of ethylene oxide (hereinafter referred to as EO).

Polyol 2: a polymer polyol (OH value: 21) obtained by polymerizing at 100°–120° C. in the presence of 1.0 part of ABIN, a mixture of 10 parts of acrylonitrile and 10 parts of styrene in 100 parts of a polyether polyol (hydroxyl equivalent weight: 2333, terminal oxyethylene content: 15%) prepared by adding 5858 parts of PO to 92 parts of glycerol followed by tipping 1050 parts of EO.

Polyol 3: a polymer polyol (OH value: 46) obtained by polymerizing at 100°–120° C. in the presence of 1.0 part of ABIN, 20 parts of acrylonitrile in 100 parts of a polyether polyol (hydroxyl equivalent weight: 1000) prepared by adding 2908 parts of PO to 92 parts of glycerol.

Polyol 4: a polyether polyol (OH value 24, hydroxyl equivalent weight: 2333, terminal oxyethylene content: 20%) prepared by adding 5526 parts of PO to 92 parts of glycerol followed by tipping 1382 parts of EO.

Crosslinker 1: a low-molecular weight polyether polyol (OH value: 600, hydroxyl equivalent weight: 94) prepared by adding to 136 parts of pentaerythritol, 120 parts of PO followed by 120 parts of EO.

Crosslinker 2: glycerol.

Crosslinker 3: 1,4-butane diol.

Isocyanate 1: a 1:1 mixture (free NCO content: 26%) of a carbodiimide-modified MDI with a prepolymer prepared from 745 parts of MDI and 100 parts of triethylene glycol.

Isocyanate 2: a crude MDI (free NCO content: 31%)

EXAMPLE I

According to the formulations shown in Table I, foams of this invention (Nos. I-1 to I-6) and a foam for comparison (No. I-7) were produced under molding conditions as follows:
mixing time: 10 seconds,
feed stock temperature: 25° C.,
mold temperature: 50° C., demolding time: 3 minutes.

Properties of the resulting foams were measured.
The results are shown in Table I.

EXAMPLE II

According to the formulations shown in Table II, foams of this invention (Nos. II-1 to II-17) and a foam for comparison (No. II-18) were produced under the same conditions as in Example I.

Properties of the resulting foams are as shown in Table II.

EXAMPLE III

According to the formulations shown in Table III, foams of this invention (Nos. III-1 to III-11) and a foam for comparison (No. III-12) were produced under the same conditions as in Example I.

Properties of the resulting foams are as shown in Table III.

EXAMPLE IV

According to the formulations shown in Table IV, foams of this invention (Nos. IV-1 to IV-4) were produced under the same conditions as in Example I.

Properties of the resulting foams are as shown in Table IV.

In Tables I to IV, each properties are as follows:
(1) density (g/cm$^3$): density of each samples tested.
(2) heat distortion temperature (° C.): according to ASTM D-648, using 18.6 Kg/cm$^2$ load.
(3) impact strength (Kg.cm/cm$^2$): according to Izod impact test (unnoched).
(4) flexural strength (Kg/cm$^2$) and flexural modulus (Kg/cm$^2$): measured using molded article of 1.27 cm×1.27 cm×12.7 cm, with span of 10 cm.

In Tables I to IV, *,  and * are as follows:
* POLYCAT 42: a strong base type trimerization catalyst, produced by Abbott Laboratories.
** C/P: equivalent ratio of Crosslinker/Polyl.
*** (I+C)/P: equivalent ratio of (Isocyanate+Crosslinker)/Polyol.

TABLE I

| Foam No. | I-1 | I-2 | I-3 | I-4 | I-5 | I-6 | I-7 |
|---|---|---|---|---|---|---|---|
| Polyol 1 | 100 | 100 | — | 100 | 100 | 100 | — |
| Polyol 2 | — | — | 100 | — | — | — | — |
| Polyol 3 | — | — | — | — | — | — | 100 |
| POLYCAT 42* | 3 | 2.5 | 2.5 | 2 | 3 | 5 | 3 |
| CCl$_3$F | 3 | 3 | 2 | 2 | 3 | 5 | 4 |
| Isocyanate 1 | 202 | — | 151 | 150 | 202 | 403 | — |
| Isocyanate 2 | — | 169 | — | — | — | — | 278 |
| NCO index | 2500 | 2500 | 2500 | 1860 | 2500 | 5000 | 2500 |
| Density | 1.02 | 0.95 | 0.94 | 1.01 | 1.02 | 1.01 | 1.05 |
| Heat distortion temperature | 127 | 114 | 116 | 118 | 127 | 134 | 112 |
| Impact strength | 10.5 | 8.8 | 15.3 | 13.1 | 10.5 | 7.9 | 5.1 |
| Flexural strength | 415 | 403 | 396 | 400 | 415 | 415 | 393 |
| Flexural modulus | 12800 | 13000 | 10300 | 11200 | 12800 | 13300 | 12300 |

TABLE II

| Foam No. | II-1 | II-2 | II-3 | II-4 | II-5 | II-6 | II-7 | II-8 | II-9 |
|---|---|---|---|---|---|---|---|---|---|
| Polyol 1 | 90 | 85 | 70 | 90 | 85 | 70 | — | — | — |
| Polyol 2 | — | — | — | — | — | — | 90 | 90 | 90 |
| Polyol 4 | — | — | — | — | — | — | — | — | — |
| Crosslinker 1 | 10 | 15 | 30 | — | — | — | — | — | — |
| Crosslinker 2 | — | — | — | 10 | 15 | 30 | — | — | — |
| Crosslinker 3 | — | — | — | — | — | — | 10 | 10 | 10 |
| POLYCAT 42* | 3.5 | 5 | 8 | 4 | 6 | 7 | 3 | 5 | 4 |
| CCl$_3$F | 4 | 5 | 8 | 3 | 5 | 8 | 2 | 3 | 3 |
| Isocyanate 1 | 319 | 426 | 747 | 360 | 515 | 982 | 207 | 413 | — |
| Isocyanate 2 | — | — | — | — | — | — | — | — | 347 |
| C/P** | 2.38 | 3.78 | 9.19 | 6.9 | 11.5 | 28 | 6.6 | 6.6 | 6.6 |
| NCO index | 1300 | 1300 | 1300 | 600 | 600 | 600 | 500 | 1000 | 1000 |
| (I + C)/P*** | 46 | 66 | 142 | 54 | 86.5 | 202 | 45 | 83 | 83 |
| Density | 0.95 | 0.96 | 0.92 | 0.93 | 0.95 | 0.92 | 0.98 | 0.96 | 0.94 |
| Heat distortion temperature | 136 | 142 | 157 | 143 | 163 | 175 | 135 | 141 | 131 |
| Impact resistance | 8.4 | 7.3 | 4.5 | 9.4 | 5.0 | 3.2 | 8.6 | 7.5 | 6.3 |
| Flexural strength | 350 | 400 | 360 | 401 | 580 | 550 | 412 | 421 | 435 |
| Flexural modulus | 13600 | 14000 | 15000 | 14400 | 17300 | 18700 | 11030 | 14500 | 15100 |

| Foam No. | II-10 | II-11 | II-12 | II-13 | II-14 | II-15 | II-16 | II-17 | II-18 |
|---|---|---|---|---|---|---|---|---|---|
| Polyol 1 | — | 85 | — | — | 95 | 95 | — | — | — |
| Polyol 2 | 90 | — | 98 | 98 | — | — | 98 | 78 | — |
| Polyol 4 | — | — | — | — | — | — | — | 20 | 90 |
| Crosslinker 1 | — | 15 | 2 | 2 | — | — | — | — | 10 |
| Crosslinker 2 | — | — | — | — | 5 | 5 | — | — | — |
| Crosslinker 3 | 10 | — | — | — | — | — | 2 | 2 | — |
| POLYCAT 42* | 7 | 4 | 4 | 5 | 4 | 5 | 4 | 4 | 3.5 |
| CCl$_3$F | 8 | 3 | 4 | 5 | 4 | 4 | 4 | 4 | 4 |
| Isocyanate 1 | 951 | 300 | 300 | 450 | 350 | — | 300 | 300 | 305 |
| Isocyanate 2 | — | — | — | — | — | 300 | — | — | — |
| C/P** | 6.6 | 3.78 | 0.58 | 0.58 | 3.40 | 3.40 | 1.78 | 1.73 | 2.78 |

TABLE II-continued

| NCO index | 2300 | 916 | 3198 | 4797 | 1038 | 1061 | 1823 | 1804 | 1300 |
|---|---|---|---|---|---|---|---|---|---|
| (I + C)/P*** | 167 | 48 | 51 | 76 | 49 | 50 | 52 | 51 | 52 |
| Density | 0.93 | 0.98 | 0.95 | 0.97 | 0.97 | 0.93 | 0.94 | 0.93 | 1.02 |
| Heat distortion temperature | 171 | 138 | 130 | 139 | 136 | 129 | 131 | 123 | 121 |
| Impact resistance | 3.2 | 9.6 | 9.8 | 8.2 | 7.4 | 7.1 | 8.7 | 8.5 | 7.1 |
| Flexural strength | 438 | 485 | 394 | 386 | 407 | 421 | 398 | 371 | 343 |
| Flexural modulus | 17500 | 14200 | 12300 | 14100 | 14600 | 15100 | 13000 | 11300 | 9980 |

TABLE III

| Foam No. | III-1 | III-2 | III-3 | III-4 | III-5 | III-6 | III-7 | III-8 | III-9 | III-10 | III-11 | III-12 |
|---|---|---|---|---|---|---|---|---|---|---|---|---|
| Polyol 1 | 80 | 85 | 85 | 90 | 95 | 98 | 98 | 95 | 95 | 90 | — | — |
| Polyol 2 | — | — | — | — | — | — | — | — | — | — | — | — |
| Polyol 4 | — | — | — | — | — | — | — | — | — | — | 90 | — |
| | | | | | | | | | | | | 90 |
| Crosslinker 1 | 20 | 15 | 15 | 10 | 5 | 2 | 2 | — | — | 10 | 10 | 10 |
| Crosslinker 2 | — | — | — | — | — | — | — | 5 | — | — | — | — |
| Crosslinker 3 | — | — | — | — | — | — | — | — | 5 | — | — | — |
| POLYCAT 42* | 2 | 2 | 2 | 2 | 3 | 2 | 2 | 2 | 2 | 2 | 2 | 2 |
| $CCl_3F$ | 2 | 1 | 2 | 2 | 3 | 2 | 2 | 2 | 2 | 2 | 2 | 2 |
| Isocyanate 1 | 103 | 70 | 98 | 123 | 140 | 97 | 148 | 119 | 128 | — | 91 | 94 |
| Isocyanate 2 | — | — | — | — | — | — | — | — | — | 103 | — | — |
| C/P** | 5.36 | 3.78 | 3.78 | 2.34 | 1.13 | 0.44 | 0.44 | 3.44 | 2.34 | 2.34 | 3.17 | 2.78 |
| NCO index | 250 | 214 | 300 | 500 | 850 | 850 | 1300 | 350 | 500 | 500 | 400 | 400 |
| (I + C)/P*** | 15.9 | 14 | 18.1 | 19.0 | 19.2 | 12.7 | 18.7 | 19.0 | 19.0 | 19.0 | 19.9 | 17.9 |
| Density | 1.01 | 1.06 | 0.98 | 1.01 | 0.96 | 0.97 | 0.97 | 0.99 | 0.97 | 0.96 | 1.02 | 0.97 |
| Impact strength | 12.1 | 13 | 13.4 | 15.2 | 14.8 | 17.3 | 15.3 | 12.8 | 15.6 | 12.3 | 16.5 | 13.8 |
| Flexural strength | 370 | 392 | 431 | 398 | 320 | 350 | 390 | 390 | 385 | 410 | 310 | 320 |
| Flexural modulus | 12300 | 8900 | 10800 | 9600 | 11300 | 8000 | 10100 | 11400 | 10500 | 11600 | 9800 | 8100 |
| Heat distortion temperature | 78 | 79 | 80 | 83 | 115 | 78 | 117 | 82 | 91 | 78 | 76 | 69 |

TABLE IV

| Foam No. | IV-1 | IV-2 | IV-3 | IV-4 |
|---|---|---|---|---|
| Polyol 1 | 85 | 80 | 80 | — |
| Polyol 2 | — | — | — | 75 |
| Crosslinker 1 | 15 | 20 | 20 | — |
| Crosslinker 2 | — | — | — | 25 |
| POLYCAT 42* | 2 | 3 | 3 | 3 |
| $CCl_3F$ | 2 | 3 | 2 | 3 |
| Isocyanate 1 | 131 | 185 | 144 | 204 |
| C/P** | 3.78 | 5.36 | 5.36 | 29 |
| NCO index | 400 | 450 | 350 | 150 |
| (I + C)/P*** | 23 | 34 | 27.6 | 74 |
| Density | 0.95 | 0.99 | 1.05 | 0.96 |
| Flexural strength | 343 | 390 | 410 | 374 |
| Flexural modulus | 10600 | 13900 | 13600 | 12500 |
| Heat distortion temperature | 8.8 | 119 | 89 | 115 |
| Impact strength | 8.9 | 6.7 | 9.3 | 10.3 |

What is claimed as new and desired to be secured by Letters Patent is:

1. A process for producing a cellular or noncellular polyisocyanurate resin, which comprises reacting an organic polyisocyanate with at least one high-molecular weight polyhydroxyl compound with or without a cross-linker, in the presence of trimerization catalyst, in the presence of or in the absence of a blowing agent, wherein (1) at least a part of said polyhydroxyl compound is a polymer polyol derived from a high-molecular weight polyol having a molecular weight of at least 4500 and an ethylenically unsaturated monomer, (2) isocyanate index is 200–5000, and (3) the resin has a density of at least 0.5 g/cm$^3$.

2. The process of claim 1, wherein a noncellular polyisocyanurate resin is produced by carrying out the reaction substantially in the absence of the blowing agent.

3. The process of claim 1, wherein a cellular polyisocyanurate resin is produced by carrying out the reaction in the presence of water, a halogen-substituted aliphatic hydrocarbon blowing agent, or a combination thereof.

4. The process of claim 3, wherein the reaction is carried out in the presence of at most 5×x% of the halogene-substituted aliphatic hydrocarbon blowing agent and at most 1×y% of water, based on the total weight of said polyisocyanate, said polyhydroxyl compound and the crosslinker, wherein x and y are optional numbers of 0–1 which satisfy the equation: $x+y=1$.

5. The process of claim 1, wherein the isocyanate index is 500–5000.

6. The process of claim 1 or 5, wherein equivalent ratio of (said polyisocyanate+the crosslinker): said polyhydroxyl compound is at least 15:1.

7. The process of claim 1 or 5, wherein equivalent ratio of (said polyisocyanate+the crosslinker): said polyhydroxyl compound is at least 20:1.

8. The process of claim 1, wherein equivalent ratio of (said polyisocyanate+the crosslinker): said polyhydroxyl compound is between 15:1 and 25:1.

9. The process of claim 1, wherein equivalent ratio of said polyisocyanate: the crosslinker is at least 84: at most 16.

10. The process of claim 1, wherein said high-molecular weight polyol is a polyetherpolyol.

11. The process of claim 1, wherein said high-molecular weight polyol has a primary OH content of 10–80%.

12. The process of claim 1, wherein said high-molecular weight polyol is a polyether polyol having a terminal oxyethylene content of 5–50% by weight.

13. The process of claim 1, wherein the crosslinker has a equivalent weight of 30–140.

14. The process of claim 1, wherein the crosslinker is at least one selected from low-molecular weight polyols, polyamines and aminoalcohols.

15. The process of claim 1, wherein the polymer polyol is used in an amount of 70–90% by weight based on the total weight of said polyhydroxyl compound and the crosslinker.

16. The process of claim 1, wherein a polyisocyanurate resin molded article is formed by reaction injection molding.

17. A high-density polyisocyanurate resin, which has been obtained by the process of claim 1.

18. A high-density polyisocyanurate resin molded article, which has been obtained by the process of claim 16.

19. A high-density polyisocyanurate resin having improved rigidity, heat resistance and impact resistance, which has been obtained by reacting an organic polyisocyanate with at least one high-molecular weight polyhydroxyl compound, in the presence of trimerization catalyst in the presence of or in the absence of a blowing agent, wherein (1) at least a part of said polyhydroxyl compound is a polymer polyol derived from a high-molecular weight polyol having a molecular weight of at least 4500 and an ethylenically unsaturated monomer, (2) isocyanate index is 1500–5000, and (3) the resin has a density of at least 0.5 g/cm$^3$.

20. The resin of claim 19, which has a flexural modulus of at least 8000 Kg/cm$^2$, a heat distortion temperature of at least 100° C. and an unnoched Izod impact strength of at least 8 Kg.cm/cm$^2$.

21. A high-density polyisocyanurate resin having an improved heat resistance and rigidity, which has been obtained by reacting an organic polyisocyanate with at least one high-molecular weight polyhydroxyl compound and a crosslinker, in the presence of a trimerization catalyst with or without a blowing agent, wherein (1) at least a part of said polyhydroxyl compound is a polymer polyol derived from a high-molecular weight polyol having an equivalent weight of 500–3000 and an ethylenically unsaturated monomer, (2) isocyanate index is 500–5000, and (3) equivalent ratio of (said polyisocyanate + the crosslinker): said polyhydroxyl compound is at least 20:1.

22. The resin of claim 21, which has a heat distortion temperature of at least 120° C. and a flexural modulus of at least 10000 Kg/cm$^2$.

23. A high-density polyisocyanurate resin having an improved impact resistance, which has been obtained by reacting an organic polyisocyanate with at least one high-molecular weight polyhydroxyl compound and a crosslinker, in the presence of a trimerization catalyst with or without a blowing agent, wherein (1) at least a part of said polyhydroxyl compound is a polymer polyol derived from a high-molecular weight polyol having an equivalent weight of 500–3000 and an ethylenically unsaturated monomer (2) isocyanate index is at least 200, and (3) equivalent ratio of (said polyisocyanate + the crosslinker): said polyhydroxyl compound is at most 20:1.

24. The resin of claim 23, which has unnoched Izod impact resistance of at least 10 Kg.cm/cm$^2$.

25. A high-density polyisocyanurate resin having an improved rigidity, which has been obtained by reacting an organic polyisocyanate with at least one high-molecular weight polyhydroxyl compound and a crosslinker, in the presence of a trimerization catalyst with or without a blowing agent, wherein (1) at least a part of said polyhydroxyl compound is a polymer polyol derived from a high-molecular weight polyol having an equivalent of 500–3000 and an ethylenically unsaturated monomer, (2) isocyanate index is 200–500, (3) equivalent ratio of (said polyisocyanate + the crosslinker): said polyhydroxyl compound is at least 20:1, and (4) the resin has a density of at least 0.5 g/cm$^3$.

26. The resin of claim 25, which has flexural modulus of at least 10000 Kg/cm$^2$.

27. The resin of claim 26, wherein said polyisocyanate is a 1:1 mixture (free NCO content: 26%) of a carbodiimide—modified diphenyl—methane-4,4'-diisocyanate (MDI) with a prepolymer prepared from 745 parts of MDI and 100 parts of triethylene glycol.

* * * * *